United States Patent
Hopkins et al.

(10) Patent No.: US 10,103,945 B2
(45) Date of Patent: Oct. 16, 2018

(54) SERVER SIDE CONTENT DELIVERY NETWORK QUALITY OF SERVICE

(71) Applicant: Level 3 Communications, LLC, Broomfield, CO (US)

(72) Inventors: William Hopkins, Brighton, CO (US); William R. Power, Boulder, CO (US)

(73) Assignee: Level 3 Communications, LLC, Broomfied, CO (US)

(*) Notice: Subject to any disclaimer, the term of this patent is extended or adjusted under 35 U.S.C. 154(b) by 305 days.

(21) Appl. No.: 15/091,454

(22) Filed: Apr. 5, 2016

(65) Prior Publication Data

US 2016/0294642 A1    Oct. 6, 2016

Related U.S. Application Data (60) Provisional application No. 62/143,573, filed on Apr. 6, 2015.

(51) Int. Cl.
  *G06F 13/00* (2006.01)
  *H04L 12/24* (2006.01)
  *H04L 12/26* (2006.01)

(52) U.S. Cl.
  CPC ............ *H04L 41/142* (2013.01); *H04L 41/12* (2013.01); *H04L 43/0829* (2013.01); *H04L 43/0864* (2013.01)

(58) Field of Classification Search
  CPC ............... H04L 41/142; H04L 43/0829; H04L 43/0864; H04L 41/12
  USPC ......................... 709/224, 223, 203, 231–235
  See application file for complete search history.

(56) References Cited

U.S. PATENT DOCUMENTS

| | | | |
|---|---|---|---|
| 8,984,116 B2* | 3/2015 | Ge ........................ | H04L 43/04 709/223 |
| 9,065,867 B2* | 6/2015 | Prasad ............. | H04L 29/12066 |
| 9,413,814 B2* | 8/2016 | Jackowski ............. | H04L 47/19 |
| 9,414,248 B2* | 8/2016 | Kovvali ................ | H04W 24/08 |
| 9,451,000 B2* | 9/2016 | Gero ...................... | H04L 67/06 |
| 2013/0282896 A1 | 10/2013 | Ge et al. | |
| 2013/0304796 A1 | 11/2013 | Jackowski et al. | |
| 2014/0156740 A1 | 6/2014 | Prasad | |
| 2014/0189040 A1* | 7/2014 | Gero ...................... | H04L 67/06 709/213 |
| 2014/0269269 A1 | 9/2014 | Kovvali et al. | |

OTHER PUBLICATIONS

International Preliminary Report on Patentability dated Oct. 10, 2017, Int'l Appl. No. PCT/US16/026115, Int'l Filing Date Apr. 6, 2016; 6 pgs.

(Continued)

Primary Examiner — Kenneth R Coulter (57) ABSTRACT

Aspects of the present disclosure involve systems and methods for monitoring and quantifying the performance of a content delivery network (CDN) from a client side perspective based on server side events. In one particular embodiment, one or more content servers of the CDN may provide connectivity or other performance information to a collector device or site. This information may be reported by each of the content servers for each request for content received at the server. The collector site may then store the received performance information in a database for analysis by one or more systems.

20 Claims, 5 Drawing Sheets

(56) References Cited

OTHER PUBLICATIONS

International Search Report dated Jul. 15, 2016, Int'l Appl. No. PCT/US16/026115, Int'l Filing Date Apr. 6, 2016; 3 pgs.
Written Opinion of the International Searching Authority dated Jul. 15, 2016, Int'l Appl. No. PCT/US16/026115, Int'l Filing Date Apr. 6, 2016; 4 pgs.

\* cited by examiner

SERVER SIDE CONTENT DELIVERY NETWORK QUALITY OF SERVICE

RELATED APPLICATIONS

This application claims priority under 35 U.S.C. § 119(e) to U.S. Provisional Application No. 62/143,573 entitled "SERVER SIDE CONTENT DELIVERY NETWORK QUALITY OF SERVICE", filed on Apr. 6, 2015 which is incorporated by reference in its entirety herein.

TECHNICAL FIELD

Aspects of the present disclosure relate to measuring and using content delivery network (CDN) performance metrics and quality of service indicators of CDN client side performance based on a server side view of CDN performance.

BACKGROUND

The Internet and the World Wide Web (the "Web") have become ubiquitous. Content providers (publishers) now use the Internet (and, particularly, the Web) to provide all sorts of content to numerous clients all over the world. In order to offload the job of serving some or all of their content, many content providers now subscribe to content delivery networks (CDNs). Using a CDN, content can be served to clients from the CDN (i.e., from one or more servers in the CDN) instead of from the content provider's server(s). In a caching CDN, content may also be cached on some or all of the CDN servers, either before being served or in response to specific requests for that content. Having content cached within edge servers of the CDN enhances the performance of the CDN because the content does not have to be retrieved from origin servers or other locations, which are less efficient than edge servers in providing content.

Numerous forms of content may be served from the CDN. For example, television shows and movies may now be accessed from any number of Web sites, and the shows and movies may actually be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once only provided on disc and mailed to recipients, are now routinely distributed to devices using only network connections, and the updates and patches are delivered from a CDN.

It is with these observations in mind, among others, that various aspects of the present disclosure were conceived and developed.

SUMMARY

One implementation of the present disclosure may take the form of a content delivery network monitoring method. The method may comprise obtaining content request performance metrics from a content server of a content delivery network (CDN), the performance metrics related to processing of a content request from a client device by the content server, storing the obtained content request performance metrics in a database, and receiving enrichment information comprising network connection information. The method may also include the operations of enriching the performance metrics by correlating received enrichment information corresponding to the processed content request with the performance metrics, wherein correlating the received enrichment information corresponding to the processed content request with the performance metrics is based at least on an identification of the client device and isolating an external network performance issue from a CDN performance issue based at least on the enriched performance metrics.

Another implementation of the present disclosure may take the form of a content delivery network. The content delivery network includes a content server receiving a content request from a client device in communication with the content server and obtaining content request performance metrics related to processing of a content request, a database storing the content request performance metrics, and a collector device. The collector device comprises at least one processor, at least one communication port for communication with the database, and a tangible computer-readable medium with one or more executable instructions stored thereon. When executed, the instructions call the at least one processor to perform the operations of receiving the content request performance metrics from the content server, transmitting the content request performance metrics to the database over the at least one communication port, and receiving enrichment information comprising network connection information. In addition, the operations cause the processor to perform the operations of enriching the performance metrics by correlating the received enrichment information corresponding to the processed content request with the performance metrics, wherein correlating the received enrichment information corresponding to the processed content request with the performance metrics is based at least on an identification of the client device and isolating an external network performance issue from a CDN performance issue based at least on the enriched performance metrics.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve systems and methods for monitoring and quantifying the performance of a content delivery network (CDN) from a client side perspective based on server side events. In one particular embodiment, one or more content servers of the CDN may provide connectivity or other performance information to a collector device or site. This information may be reported by each of the content servers for each request for content received at the server. The collector site may then store the received performance information in a database for analysis by one or more systems. The performance information received may include a measured time for one or more requested packets to be transmitted to a client device and an acknowledgement received at the content server of the successful receipt of the packets at the client device. Other information may include a congestion window for the connection (which is one of the factors that determines the number of bytes of the requested content that may be outstanding at any one time), a measurement of packet loss for the transmission, the total time for fulfilling the request, and the like. Such information may be measured at the content server socket and transmitted to the collector site at the completion of each packet request.

In addition, device and network information may also be stored in the database and correlated to the received information from the content servers. For example, geographic location information of the client device, a client resolver device, the client service provider, and/or the content server may be provided to the database and correlated with the received performance information. Such information may be utilized by a system in communication with the database to determine which paths through the CDN and associated networks are optimal to provide content to requesting devices. Such information may also be monitored over time to provide an indication of times of high demand and/or times of slower performance of providing the content from the CDN. Such information may be aggregated on a per server basis, a per client basis, a content server area, a client device area, a CDN basis, etc. By receiving the connectivity and performance information from one or more content servers of the CDN, administrators of the CDN do not need to rely on third party performance monitoring systems and may analyze and respond to measured performance issues of the CDN in a direct and fast manner.

Figure 1:
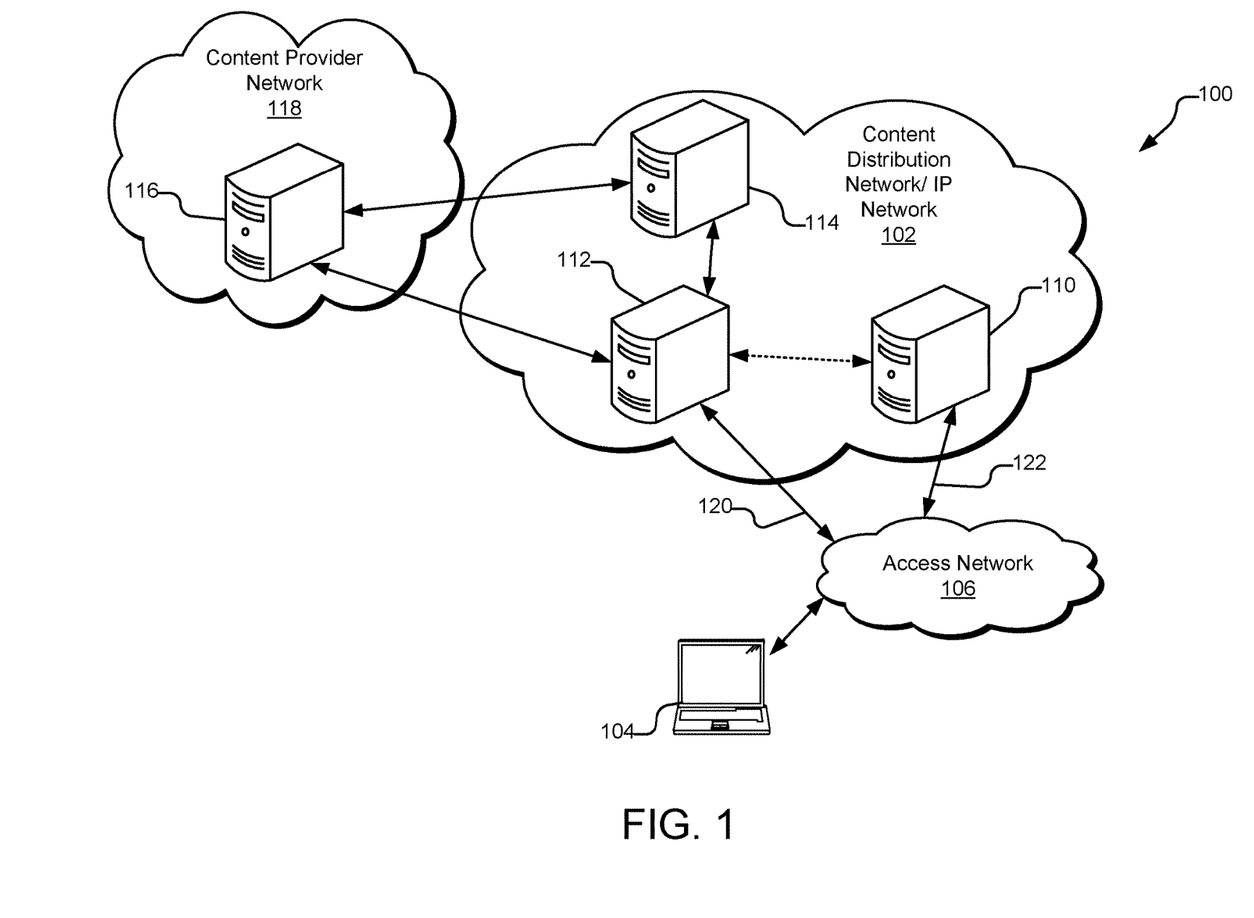
FIG. 1 is an example network environment for distributing content over a telecommunications network.

FIG. 1 is an example network environment 100 for distributing content to one or more users connected to the network. Although illustrated in FIG. 1 as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied, other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

The term "content" as used herein means any kind of data, in any form, regardless of its representation and regardless of what it represents. The term "content" may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content. In some instance, a content manifest is delivered to the client device, and that client manifest provides a list of chunks or fragments of data making up the content. The client then issues a series of requests to a content server for each chunk of content data.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Such access points may utilize a gateway networking device for entry and exit from the CDN 102. Thus, each entry point 120, 122 may include an egress gateway or an ingress gateway. Also, the user device 104 may be connected to any number of access networks 106 such that access to the CDN 102 may occur through another access network. In general, access to a CDN 102 (or underlying IP network associated with the CDN) may occur through any number of ingress gateways to the CDN through any number of access networks.

The CDN 102 is capable of providing content to a user device 104, which is generally any form of computing device, such as personal computer, a thin client, a tablet, a smart phone, a set-top box, a cable box, or the like, that is capable of running a browser and providing a user with the ability to request content over a network connection, or some other application suitable for interacting with a network and requesting content therefrom. The user device may be a consumer device deployed in a public network, may be an enterprise device deployed in a private network or other type of device. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content.

In one implementation, the CDN 102 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In many conventional CDNs, content is served in small fragments or chunks, each of which is usually requested separately from the content server 112 based on content manifest at a client device 104. In other words, the client device 104 may receive a manifest that includes the fragments that comprise the requested content and from what content server 112 of the CDN 102 the fragments are available. The device 104 or access network 106 may then utilize the content server 112 location information to request and obtain the content fragments to make up the requested content. Performance of the CDN 102, often referred to as "quality of service" (QOS), may be determined by how quickly and smoothly the requested fragments are received at the client device 104 from the content server 112. In one particular embodiment, the QOS is measured by a performance application executing on the client device 104. In general, the performance application monitors the requesting and receiving of the packets that comprise the content to determine the CDN 102 performance. For example, buffering events of the requested packets may be tracked. In video (or audio) streaming, some portion of the content is pre-loaded in a memory buffer prior to beginning to play. The content is read and played from the buffer, and the remaining content is stored in the buffer as the content is being played. A buffering event typically involves the play outpacing the buffering of content such that the play is momentarily halted while sufficient content is buffered at the client device 104 to resume play.

It is often the case that the performance application monitoring performance is a third party application running on the client device 104. As such, CDN performance information is generally not known by administrators of the CDN itself. Rather, performance information of the CDN is provided to the CDN administrator long after the slowing event is captured. Thus, CDN administrators may not receive a complete picture of the performance or events causing performance issues with enough time to address such events. Further, because the CDN performance analysis is limited to the information gathered and provided by the third party application, information concerning the network that may aid the CDN administrator in determining the proper cause and recourse of a performance slowdown may not be ultimately available. Thus, a mechanism through which a CDN administrator may monitor and analysis the performance of the network may allow the administrator to better understand the CDN performance and respond to detected slowdowns accordingly.

Figure 2:
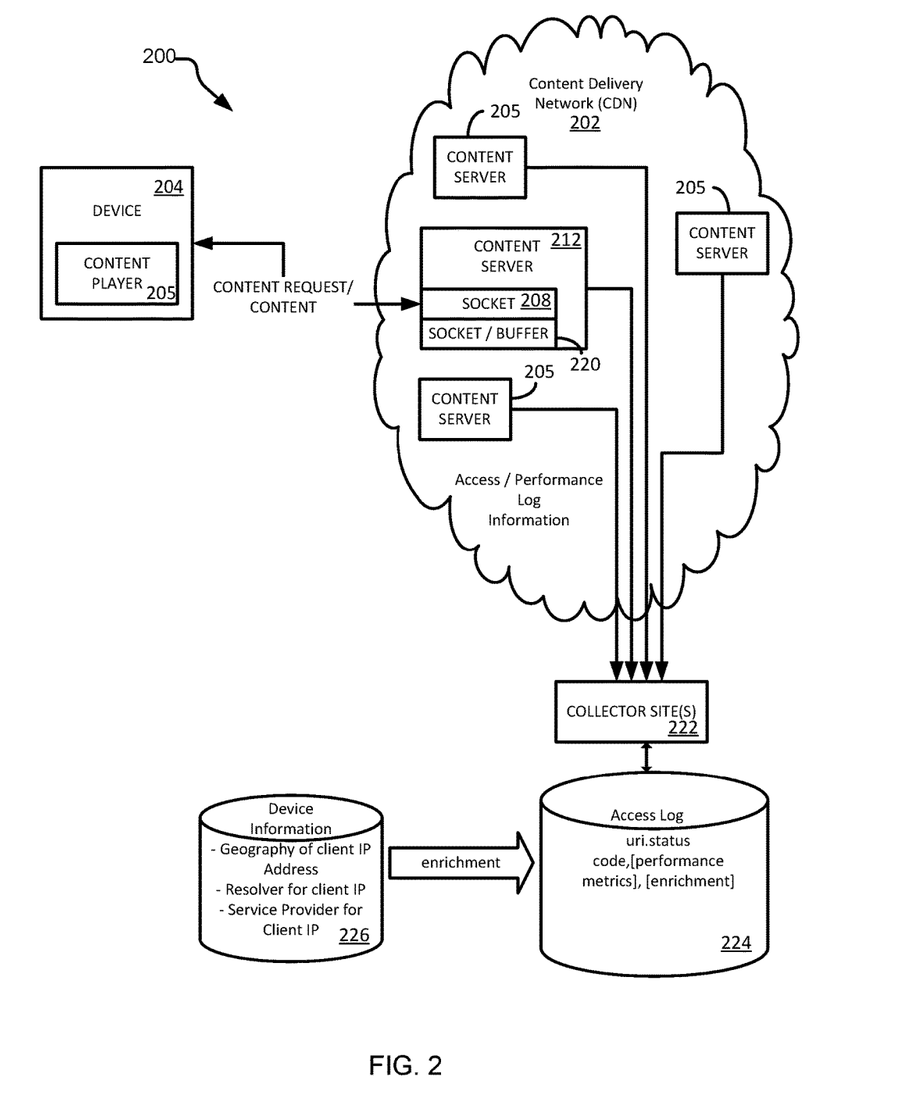
FIG. 2 is a network diagram depicting a content delivery network with at least one content server configured to monitor performance and log performance information.

FIG. 2 illustrates one example network configuration 200 for practicing aspects of the present disclosure to provide QOS measurements of a CDN from the CDN-side or server-side of the content transmission. As described above, the illustrated network 200 may include many components involved in servicing a request and providing content; however, the diagram here focuses on only some components involved in the system and one of ordinary skill will readily understand other conventional components within the network. With respect to content delivery, a request originates from a computing device 204, which may be operating a browser or other application—e.g., content player 205—for playing or otherwise receiving and using the content from a content delivery network (CDN) 202. Once connected to a content server 212 as described above, the client device 204 and CDN 202 may then exchange the packets of data of the requested content.

The content server 212, which may be an edge server device, cluster of devices, or other devices capable of serving content directly or indirectly, receives a request and delivers the content. In one embodiment, the server 212 may be configured to communicate using TCP and establish a TCP connection with the client. For example, to provide the requested fragments of the content to the requesting device 204, the content server 212 may establish a TCP socket 208 at the server that communicates with the device. Through the socket 208, a series of requests for fragments of the content is received from the device 204 and the requested content fragments are provided to the device accordingly. After completion of each request/transmission of a content fragment, the next fragment of the content is requested and provided. In this manner through the TCP socket 208, the some or all of the content is provided to the requesting device 204.

In some embodiments, the content server 212 is configured to obtain information concerning the transmission of the content to the device 204. For example, the content server 212 may track the receipt of a request, the client address of the request (the Internet Protocol (IP) address of the device 204 issuing the content request, which may be the full/32 address), the host IP of the requesting client, the time of day of the request, the delivery of the requested content, the round trip duration or timing (RTT) between request and delivery, the number of bytes in the request (or some other measure of the amount of information provided in the request), http status code, congestion window, packet loss, and various other performance related metrics associated with the request and delivery. In one example, the information is gathered from the TCP socket kernel 208 established between the device 204 and the content server 212. Further, such information may be obtained for each fragment of content requested by the device, for a subset of fragments of the content, or for the entire content file.

Once obtained by the server 212, some or all of the information may be transmitted or otherwise provided to a collector site(s) 222 in communication with the CDN 202. The collector site 222 may be any computing device in communication with the CDN 202 for receiving and processing performance information from content servers 212, 214. For example, the collector site 222 may be a compute server associated with the CDN 202 for receiving the performance information from the content servers 212, 214. In another example, the collector site 222 may include any number of compute devices in communication with the CDN 202. In a similar manner as described above, a plurality of content servers 214 of the CDN may collect performance information for providing requested content to one or more devices connected to the CDN. This information may be transmitted to and aggregated by the collector site 222. The performance information may be collected for all or some requests received by the CDN 202 at the content servers 212, 214 of the CDN.

An access log database 224 may be in communication with the collector site(s) 222 for storing the received performance information. More particularly, the collector site 222 may include a program for parsing the received performance information into fields (such as device IP address, content server IP address, RTT, etc.) and storing such information in the access log database 224. The performance data from the content servers 212, 214 may be stored in any manner in the access log database 224 as determined by the collector site 222. Further, the collector site 222 and/or the access log database 224 may be accessible by an administrator of the CDN 202. For example, a CDN administrator may log into the collector site 222 to obtain the performance information from the access log database 224. Also, the collector site 222 may include one or more applications to analyze the stored data in the database 224. For example, the collector site 222 may analyze the data to determine when the performance of a particular content server 212, 214 or connection to a client device 204 drops below a threshold value. When such a circumstance occurs, the collector site 222 may transmit an indication of the compromised performance to a CDN administrator or administrator device.

In addition to storing received performance information, the access log database 224 may also receive enriching information from one or more device information databases 226. In general, enriching information 226 includes device information for one or more of the devices utilized by the CDN 202. In one particular example, enriching device information 226 may include geographic location information associated with client IP address, resolver information for a client IP, service provider for a client IP, geographic location information for a content server, and the like. This information may be paired with performance information in the access log database 224 by the collector site 222 or other aggregating device. For example, a client IP address may be received from a content server 212, 214 as part of the performance information provided to the collector site 222. When storing the client IP address, the collector site 222 may access an associated geographic location of the client IP address and store the geographic location in the access log database 224 with the performance information. The enrichment information 226 may be obtained from any database of network information, including databases of network infrastructure, third party databases of IP location information, and the like. Such enrichment information 226 may aid an administrator of the CDN 202 in diagnosing a determined performance issue of the CDN. For example, the performance information may indicate that all requests from a particular access network or from a particular geographic location are suffering low performance at a particular time. The administrator may then determine that the slow performance is due to a problem at the access network and not the CDN 202. In response, transmission of packets to client devices may be routed around the identified access network to improve the transmission of the content.

Figure 3:
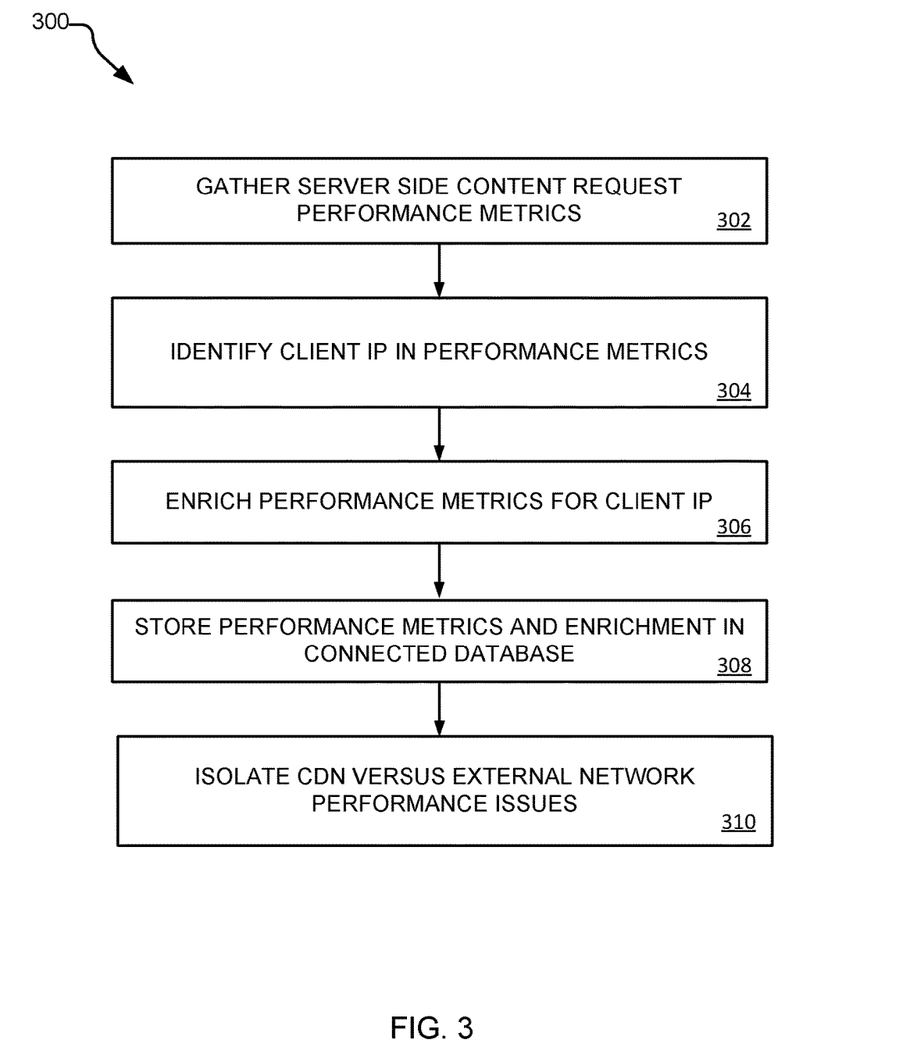
FIG. 3 is a flowchart of a method of gathering CDN performance data from a content server and enriching the data to isolate external network issues.

FIG. 3 is a flowchart of a method 300 of gathering CDN performance data from a content server and enriching the data to isolate external network issues. In one embodiment, the operations of the method 300 may be performed by the collector site 222 as discussed above. In other embodiments, the operations may be performed by any number of devices of the CDN 202, such as content servers 212, 214. Regardless, the operations may utilize the infrastructure of the CDN 202 to perform one or more of the discussed operations of the method 300.

Beginning in operation 302, the collector site may gather or aggregate server side content request performance metrics. As discussed above, such metrics may be obtained by the corresponding content servers 212, 214 through the socket connections 208 established to provide the fragments of the requested content to a user device 204. As a content server 212, 214 may establish many such sockets 208 with many client devices 204, a content server may provide large amounts of performance data to the collector site 222. As also mentioned above, such metrics may be transmitted to the collector site 222 upon the completion of each received fragment request.

The received performance metrics may include any information concerning the transmission of content fragments to a client device 204. Thus, in operation 304, the collector site 222 may identify a client IP address associated with the transmission of the fragment from the received performance metric. In other examples, an access network IP address or identifier may be obtained from the performance metrics received. Further, in operation 306, the collector site 222 may associate enriching information 226 with the obtained IP address or identifier. For example, the collector site 222 may associate a geographic location with the determined client IP address from the received performance metric information. In another example, a geographic location of an identified access network may be associated with the performance metric.

In operation 308, the collector site 222 stores the received performance metric in an access log database 224. In one embodiment, the enrichment information 226 may also be stored in the access log database 224 after being associated with the information extracted from the performance metrics. In operation 310, the collector site 222 or other device executing an analyzing program may obtain the stored information and determine the probable location within the network of a detected issue. For example, an administrator device may access the database 224 of information when a slowdown of providing content is detected, either from the collector site 222, a monitoring device, or from a third party monitoring system. Such an indication of a slowdown in performance may indicate particular client IP addresses, content server IP addresses, access networks, and/or geographic locations. With this information, the administrator may target specific performance metrics stored in the access log database 224 that is associated with the known information. Further, through an analysis of the stored performance metrics, the administrator may locate the cause of the slowdown within the CDN 202 or external to the CDN. Proper remedial actions may take place once the location within the networks of the issue is determined to improve the overall performance of the CDN in providing the requested content.

As introduced above, a content server 212, 214 may compute or gather information for round trip timing for each request (RTT). RTT is the amount of time between receiving a request for content or fragment of the content and transmitting all of the data packets for the request. So, for example, RTT for a content chuck is the time between when a request for a chunk is received at the content server 212 from the requesting device 204 and when the last data packet of the chunk is sent to the device by the server. In one example, RTT is computed by starting a timer when a request is received at the server 212 and stopping the timer when the last byte or packet of the request is sent from the server to the requesting device 204. The RTT captures events internal to the CDN as well as external to the CDN. For example, in a caching CDN 202, content may be stored locally at the edge server 212 receiving the request or the content may have to be retrieved, such as from an origin or mid-tier cache, and cached at the edge before servicing the request. The RTT, in this case, also accounts for the amount of time to drain the socket buffer 220 of the content associated with the request.

In one embodiment of the present disclosure, the content server 212 is further configured to record time to write to a socket buffer 220. In general, each socket 208 of the edge server 212 includes a socket buffer 220. Prior to transmitting information to a device 204 associated with a request, the information or data is first retrieved by the edge server 212 (from local edge cache if the content is stored locally at the edge, or the server retrieves the content from some other part of the CDN 202 or even in some cases from the content origin which may be outside the CDN) and buffered in the socket buffer 220. Normally, transmitting content from the socket buffer 220 takes micro- to milli-seconds. However, in some cases there is congestion on the network outside the CDN 202 such that information drains from the socket buffer 220 more slowly such that a back pressure condition occurs that prohibits or otherwise slows new content from being stored in the buffer for transmission. Thus, socket buffer 220 performance becomes a proxy for performance of the networks connected to the CDN 202 and not the CDN itself or the edge server device 212. Thus, the RTT time less the socket buffer time 220 isolates the time to service a request by the CDN 202 from external issues, and the socket buffer timing provides a window into the external network issues.

Figure 4:
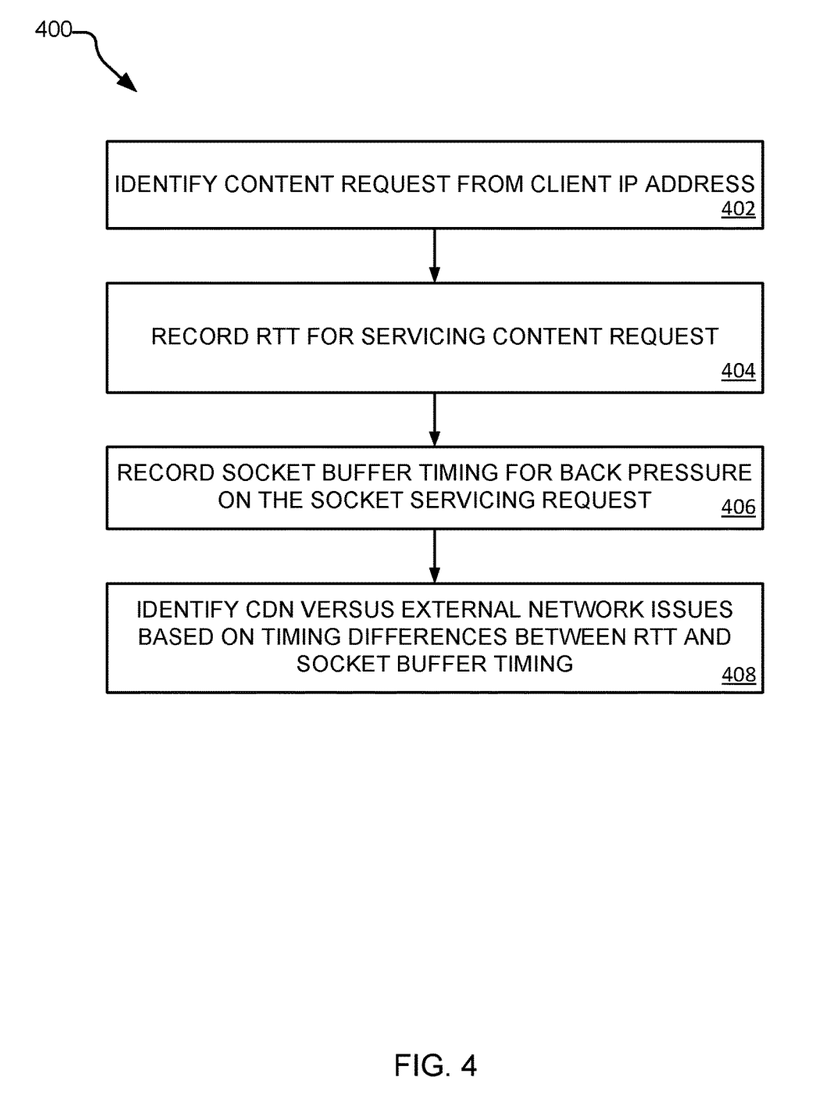
FIG. 4 is a flowchart of a method of using round trip timing and socket buffer congestion timing to isolate internal CDN performance from external network performances.

In a specific implementation discussed in relation to FIG. 4, the socket kernel 208 is configured to provide a notification to the content server 212 of when the socket buffer 220 has space to receive new information. Thus, as requests are being processed, the socket kernel 208 is providing notifications as to when the socket buffer 212 has room to process a new request. In such an implementation, the RTT timer is started when there is a new request (e.g., upon receipt of a get request), and the CDN 202 is also logging the amount of time between the start of the RTT timer and when the kernel 208 reports when the socket buffer 220 can receive the data for the request. In some instances, the socket buffer 220 may simply be ready to receive information—when there is no external network congestion. In other instances, there may be a block due to the socket buffer 220 not being ready to receive new data, and the second (socket buffer) timer is started on the notion of the block. The socket buffer 220 timer may be started when content is attempted to and stopped when it is written.

Turning now to the method 400 of FIG. 4, a flowchart is illustrated for using round trip timing and socket buffer 220 congestion timing to isolate internal CDN 202 performance from external network performances. Similar to the method of FIG. 3 discussed above, the operations of the method 400 of FIG. 4 may be performed by the collector site 222 and/or one or more content servers 212,214 of a CDN 202. Regardless, the operations may utilize the infrastructure of the CDN 202 to perform one or more of the discussed operations of the method 300.

Beginning in operation 402, the CDN 202 identifies a content request received from a client device 204 from a particular client IP address. The request may be similar to the requests discussed above for accessing or receiving content available through the CDN 202. Thus, in one example, the request includes an identification of the IP address of the requesting device, or some other client or device identifier. In operation 404, a content server 212 (or associated socket 208 of the content server) begins recording the RTT for servicing the content request. During the RTT recording, the content server 212 records sock buffer 220 timing for back pressure of the socket 208 of the client server 212 servicing the request in operation 406. In other words, the content server 212 or other CDN 202 device may monitor and record the time in which the socket buffer 220 indicates that the buffer is full and no other data may be written to the socket buffer until space is made available in the buffer. The socket buffer 220 timing may indicate back pressure on the socket 208 from the network between the CDN 202 and the requesting device 204.

In operation 408, the CDN 202 identifies a CDN 202 issue versus an issue with external network based on the recorded RTT and socket buffer 220 timing obtained above. In particular, the CDN 202 may subtract the socket buffer 220 timing from the overall RTT to identify slowdowns particular to the CDN 202 separate from those of the external network (presumably indicated in the socket buffer timing). In other words, by separating out that time in which the socket buffer 220 cannot except additional content data because of a problem in a network between the CDN 202 and the receiving device 204 from the overall RTT, a truer measurement of the CDN performance may be obtained. In this manner, the server side socket buffer delay is used as a proxy for congestion or otherwise non-CDN performance issues.

Figure 5:
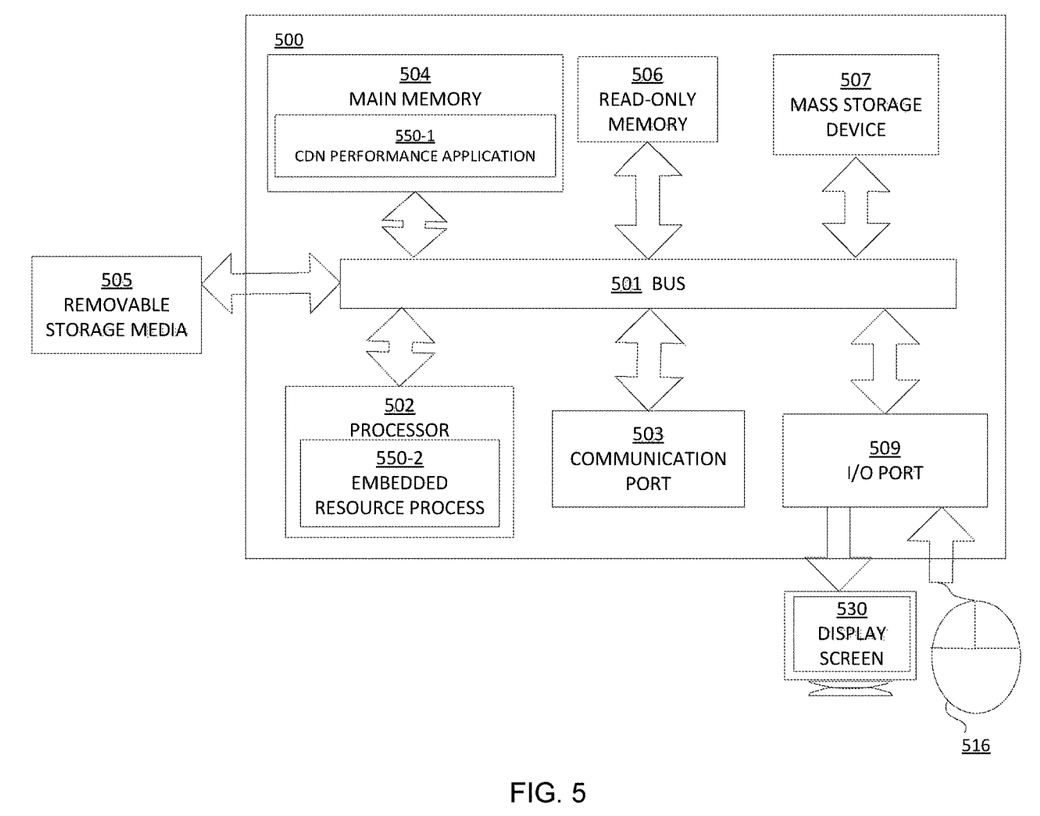
FIG. 5 is an example of a computing system that may implement various systems and methods discussed herein.

FIG. 5 is an example schematic diagram of a computing system 500 that may implement various methodologies discussed herein. For example, the computing system 500 may include may be included in the content server 212 or collector site 222 of the system 200 of FIG. 2. The computing system includes a bus 501 (i.e., interconnect), at least one processor 502 or other compute element, at least one communication port 503, a main memory 504, a removable storage media 505, a read-only memory 506, and a mass storage device 507. Processor(s) 502 can be any known processor, such as, but not limited to, an Intel® Itanium® or Itanium 2® processor(s), AMD® Opteron® or Athlon MP® processor(s), or Motorola® lines of processors. Communication port 503 can be any of an RS-232 port for use with a modem based dial-up connection, a 10/100 Ethernet port, a Gigabit port using copper or fiber, or a USB port. Communication port(s) 503 may be chosen depending on a network such as a Local Area Network (LAN), a Wide Area Network (WAN), or any network to which the computer system 500 connects. A CDN performance application, 550-1 including executable instructions for the method of FIGS. 2 and 3 as well as methods discussed herein may be in communication with peripheral devices (e.g., display screen 530, input device 516 via Input/Output (I/O) port 509.

Main memory 504 can be Random Access Memory (RAM) or any other dynamic storage device(s) commonly known in the art. Read-only memory 506 can be any static storage device(s) such as Programmable Read-Only Memory (PROM) chips for storing static information such as instructions for processor 502. Mass storage device 507 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 501 communicatively couples processor(s) 502 with the other memory, storage and communications blocks. Bus 501 can be a PCI/PCI-X, SCSI, or Universal Serial Bus (USB) based system bus (or other) depending on the storage devices used. Removable storage media 505 can be any kind of external hard drives, thumb drives, Compact Disc—Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 504 is encoded with the CDN performance engine application 550-1 that supports functionality as discussed above and as discussed further below. For example, in one embodiment, the application 550-1 may include or otherwise implement the various processes and/or instructions described herein. The application 550-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 502 accesses main memory 504 via the use of bus 501 in order to launch, run, execute, interpret or otherwise perform processes, such as through logic instructions, executing on the processor 502 and based on the application 508-1 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A content delivery network monitoring method comprising:
    obtaining content request performance metrics from a content server of a content delivery network (CDN), the performance metrics related to performance for fulfilling a content request from a client device by the content server;
    storing the obtained content request performance metrics in a database;
    receiving enrichment information comprising network connection information;
    enriching the performance metrics by correlating received enrichment information corresponding to the fulfilled content request with the performance metrics, wherein correlating the received enrichment information corresponding to the fulfilled content request with the performance metrics is based at least on an identification of the client device; and
    isolating an external network performance issue from a CDN performance issue based at least on the enriched performance metrics related to the performance for fulfilling the content request by the content server.

2. The content delivery network monitoring method of claim 1 wherein the content request performance metrics from the content server is obtained from a transmission control protocol (TCP) socket established by the content server in response to the content request from the client device.

3. The content delivery network monitoring method of claim 1 wherein the content request performance metrics comprises an indication of a number of packet losses during the fulfilling of the content request.

4. The content delivery network monitoring method of claim 1 wherein the content request performance metrics comprise a round trip timer (RTT) indication corresponding to a total time measured for providing at least a portion of a requested content.

5. The content delivery network monitoring method of claim 4 wherein the content request performance metrics further comprise the RTT indication less than a measured timing delay at a socket buffer from network back pressure on the socket buffer during the fulfilling of the content request.

6. The content delivery network monitoring method of claim 1 wherein the identification of the client device comprises an Internet Protocol (IP) address associated with the client device and included in the content request from the client device.

7. The content delivery network monitoring method of claim 6 wherein the received enrichment information comprises an estimated geographical location of the client device based on the IP address associated with the client device.

8. The content delivery network monitoring method of claim 1 wherein the identification of the client device comprises an identification of an access network through which the client device communicates with the content server.

9. The content delivery network monitoring method of claim 8 wherein the received enrichment information comprises an estimated geographical location of the access network based on the identification of the access network.

10. The content delivery network monitoring method of claim 1 wherein the identification of the client device comprises an identification of a resolver device for the client device and the received enrichment information comprises an estimated geographical location of the resolver device based on the identification of the resolver device.

11. A content delivery network comprising:
a content server receiving a content request from a client device in communication with the content server and obtaining content request performance metrics related to performance for fulfilling of a content request;
a database storing the content request performance metrics; and
a collector device comprising:
at least one processor;
at least one communication port for communication with the database; and
a tangible computer-readable medium with one or more executable instructions stored thereon, wherein the at least one processor executes the one or more instructions to perform the operations of:
receiving the content request performance metrics from the content server;
transmitting the content request performance metrics to the database over the at least one communication port;
receiving enrichment information comprising network connection information;
enriching the performance metrics by correlating the received enrichment information corresponding to the fulfilled content request
with the performance metrics, wherein correlating the received enrichment
information corresponding to the fulfilled content request with the performance metrics is based at least on an identification of the client device;
isolating an external network performance issue from a CDN performance issue based at least on the enriched performance metrics related to the performance for fulfilling the content request by the content server.

12. The content delivery network of claim 11 wherein the content server comprises a transmission control protocol (TCP) socket in communication with the client device established by the content server in response to the content request from the client device.

13. The content delivery network of claim 11 wherein the content request performance metrics comprises an indication of a number of packet losses during the fulfilling of the content request.

14. The content delivery network of claim 11 wherein the content request performance metrics comprise a round trip timer (RTT) indication corresponding to a total time measured for providing at least a portion of a requested content.

15. The content delivery network of claim 14 wherein the content request performance metrics further comprise the RTT indication less than a measured timing delay at a socket buffer from network back pressure on the socket buffer during the fulfilling of the content request.

16. The content delivery network of claim 11 wherein the identification of the client device comprises an Internet Protocol (IP) address associated with the client device and included in the content request from the client device.

17. The content delivery network of claim 16 wherein the received enrichment information comprises an estimated geographical location of the client device based on the IP address associated with the client device.

18. The content delivery network of claim 11 wherein the identification of the client device comprises an identification of an access network through which the client device communicates with the content server.

19. The content delivery network of claim 18 wherein the received enrichment information comprises an estimated geographical location of the access network based on the identification of the access network.

20. The content delivery network of claim 11 wherein the identification of the client device comprises an identification of a resolver device for the client device and the received enrichment information comprises an estimated geographical location of the resolver device based on the identification of the resolver device.

* * * * *